(12) United States Patent
Pan

(10) Patent No.: US 12,276,585 B2
(45) Date of Patent: Apr. 15, 2025

(54) PLATE GUIDED ARRAYER FOR CONSTRUCTION OF TISSUE ARRAY BLOCKS

(71) Applicant: Pantomics Inc., Fairfield, CA (US)

(72) Inventor: Langxing Pan, Fairfield, CA (US)

(73) Assignee: Pantomics Inc., Fairfield, CA (US)

( * ) Notice: Subject to any disclaimer, the term of this patent is extended or adjusted under 35 U.S.C. 154(b) by 56 days.

(21) Appl. No.: 18/166,448

(22) Filed: Feb. 8, 2023

(65) Prior Publication Data

US 2023/0228655 A1 Jul. 20, 2023

Related U.S. Application Data

(63) Continuation of application No. 17/692,062, filed on Mar. 10, 2022, now Pat. No. 11,604,121.

(60) Provisional application No. 63/300,949, filed on Jan. 19, 2022.

(51) Int. Cl.
*G01N 1/36* (2006.01)
*G01N 1/28* (2006.01)

(52) U.S. Cl.
CPC ............... *G01N 1/36* (2013.01); *G01N 1/286* (2013.01); *G01N 2001/368* (2013.01)

(58) Field of Classification Search
CPC ..... G01N 1/36; G01N 1/286; G01N 2001/368
See application file for complete search history.

(56) References Cited

U.S. PATENT DOCUMENTS

| 6,867,851 | B2 | 3/2005 | Blumenfeld et al. |
| 7,326,560 | B2 | 2/2008 | Szekeres et al. |
| 9,316,363 | B2 | 4/2016 | Lee et al. |
| 11,604,121 | B1 | 3/2023 | Pan |
| 2002/0106626 | A1 | 8/2002 | Muraca |
| 2002/0127631 | A1 | 9/2002 | Schiller et al. |
| 2006/0046282 | A1 | 3/2006 | Hewitt |

FOREIGN PATENT DOCUMENTS

| CN | 108088729 A | 5/2018 | |
| DE | 10203524 A1 * | 5/2003 | ......... A61B 10/0096 |
| TW | M427386 U | 4/2012 | |

OTHER PUBLICATIONS

Machine Translation of DE 10203524 A1 (Year: 2024).*
International Search Report on PCT/US23/60877.
Search Report on Taiwan application 112101706.

* cited by examiner

*Primary Examiner* — Michael L Hobbs
(74) *Attorney, Agent, or Firm* — Yong Chen; Lin Sun-Hoffman; Liu Chen & Hoffman LLP

(57) ABSTRACT

An arrayer for constructing a tissue array includes a recipient block holder having an upper face, a void for accommodating a tissue recipient block, and a guide plate configured to engage with the upper surface of the recipient block holder. The guide plate includes an array of through openings aligned with the void of the recipient blocking holder. The recipient block holder and the guide plate are configured to be secured to each other through securing elements. A kit including the arrayer, and punch pens for creating holes in the recipient block and for transferring tissue to the recipient block holder, is also provided. Methods of using the arrayer and the kit are also provided.

5 Claims, 7 Drawing Sheets

SECTION A-A
Donor punch pen extracting a tissue core from a donor block

A

B

PLATE GUIDED ARRAYER FOR CONSTRUCTION OF TISSUE ARRAY BLOCKS

BACKGROUND

Tissue array or tissue microarray (TMA) commonly refers to recipient blocks in which hundreds of separate cylindrical tissue cores are assembled in array fashion. Each of these recipient blocks can be cut into hundreds of thin sections (TMA tissue sections) that can then be used for high-throughput immunohistochemical or in situ hybridization analyses for protein, RNA or DNA molecules in cells or tissues. TMA technology has become a powerful tool in biomarker identification and target validation in drug discovery and biomedical studies.

Current available tissue arrayers in the market including manual, semi-automated and automated ones, commonly utilize a pair of needles or tube-like recipient and donor punchers. In these tissue arrayers, two basic processes are used for making a TMA block: 1) the recipient puncher punches a smaller hole in a recipient TMA block; 2) the donor puncher punches and obtains a tissue core from a donor tissue block, then transfers and inserts the tissue core into the smaller hole in the recipient block. Repeated actions of the above two steps create a TMA block, which are driven manually or automatically by delicate micrometers or other precision linear positioning mechanisms.

These tissue arrayers have many drawbacks, such as complicated set-up and operation, easy damages to the punchers or paraffin blocks due to unprotected punching impacts, uneven TMA core surface due to variations of surface core heights, misalignment or distorted core row or column lines of TMA blocks. In addition, none of these micrometers or other mechanical positioning mechanisms driven tissue arrayers can utilize frozen tissues to construct a frozen TMA block. These drawbacks greatly hamper the production of high quality TMA blocks and their wide application in bio-medical fields.

There is a need for a tissue arrayer that addresses some of these drawbacks.

SUMMARY OF INVENTION

In one aspect of the present disclosure, an arrayer for constructing a tissue array is provided, which comprises: a recipient block holder having an upper face, and a void for accommodating a tissue recipient block; a guide plate configured to engage with the upper surface of the recipient block holder, and including an array of through openings aligned with the void of the recipient block holder; wherein the recipient block holder and the guide plate are configured to be secured to each other through securing elements.

In some embodiments, the securing elements comprise countersink locknuts. The securing elements can further comprise countersink holes on the guide plate.

In some embodiments, the void is provided with a stopper limiting the position of the recipient block.

In some embodiments, the guide plate and the recipient block holder can be repeatedly secured together and disassembled, and wherein when the guide plate and the block holder are secured together, the guide plate and the block holder are aligned at the same position.

The arrayer can further comprise a LED light source disposed underneath the void. The LED light source can include a plurality of LED light bulbs installed on a LED plate. The arrayer can further include a LED light diffuser plate disposed above the LED light source and below the recipient block.

The array of through openings on the guide plate can be arranged as x and y directions in orthogonal configuration.

The arrayer can further include a positioning slider that slidably engages the guide plate and can be movable in a direction parallel to one of the x and y directions of the guide plate.

The block holder and the guide plate of the arrayer can be made from a metal, such as bronze.

In a further aspect, a kit for constructing a tissue array is provided, which includes: an arrayer as described herein, a first punch pen for creating a hole in a recipient block; a second punch pen for transferring a tissue core from a tissue of interest to the hole in the recipient block, wherein each of the first punch pen and the second punch pen includes a hollow puncher and a retractable eject pin slidably movable in the hollow puncher. The hollow puncher of each of the first and second punch pen can be constructed from metal, such as bronze.

In a further aspect, a method of operating an arrayer described herein is provided, which includes: positioning a recipient block in the void of the recipient block holder; securing the guide plate in relation to the recipient block holder; creating a hole on the recipient block by inserting a puncher of a recipient punch pen through one of the through openings of the guide plate and extracting a plain core from the recipient block; acquiring a portion of a tissue of interest into a hollow section of a puncher of a donor punch pen; and injecting the portion of the tissue of interest into the hole created on the recipient block through the one of the through openings of the guide plate by causing an eject pin of a donor punch pen to go through a puncher of the donor punch pen and the one of the through openings of the guide plate while positioning the puncher of the donor punch pen above the one of the through openings of the guide plate. The LED light source can be turned on during the operation of the arrayer. The portion of the tissue of interest can be a portion of a frozen tissue or a paraffin embedded tissue. For acquiring a frozen tissue sample, the acquisition can be performed in a cryo environment (a temperature below 20 degrees Celsius). For acquiring a paraffin embedded tissue sample, the acquisition can be performed in room or ambient environment.

In a further aspect, a method of constructing a tissue array is provided, which includes: providing an arrayer comprising: (a) a recipient block holder having an upper face, and a void for accommodating a tissue recipient block; and (b) a guide plate configured to engage with the upper surface of the recipient block holder and including an array of through openings aligned with the void of the recipient blocking holder; positioning a recipient block in the void of the recipient block holder; securing the guide plate in relation to the recipient block holder; creating a hole on the recipient block positioned in the void through one of the through openings of the guide plate secured with the recipient blocking holder; acquiring a portion of tissue of interest from a tissue source; and transferring the portion of the tissue of interest into the hole created on the recipient block.

The acquisition can include inserting a puncher of a recipient punch pen through one of the through openings of the guide plate and extracting a plain core from the recipient block. The transferring of the portion of the tissue of interest can be performed by injecting the portion of the tissue of interest into the hole created on the recipient block through the one of the through openings of the guide plate. The tissue source can be a paraffin-embedded tissue. The acquisition of a portion of paraffin-embedded tissue can be performed at room or ambient temperature. Alternatively, the tissue source can be a frozen tissue. For a frozen tissue, the acquisition can be performed at a cryo environment.

BRIEF DESCRIPTION OF THE DRAWINGS

The accompanying drawings, which are incorporated in and constitute part of this specification, are included to illustrate and provide further understanding of the device and methods of the present disclosure. Together with the description, the drawings serve to explain certain embodiments of the invention, but are not to limit the scope of the invention. In the drawings, like elements are denoted with like reference numerals.

DETAILED DESCRIPTION

The present disclosure provides arrayer for constructing a tissue array (or tissue microarray), a kit for constructing a tissue array, and methods of use thereof.

Figure 1:
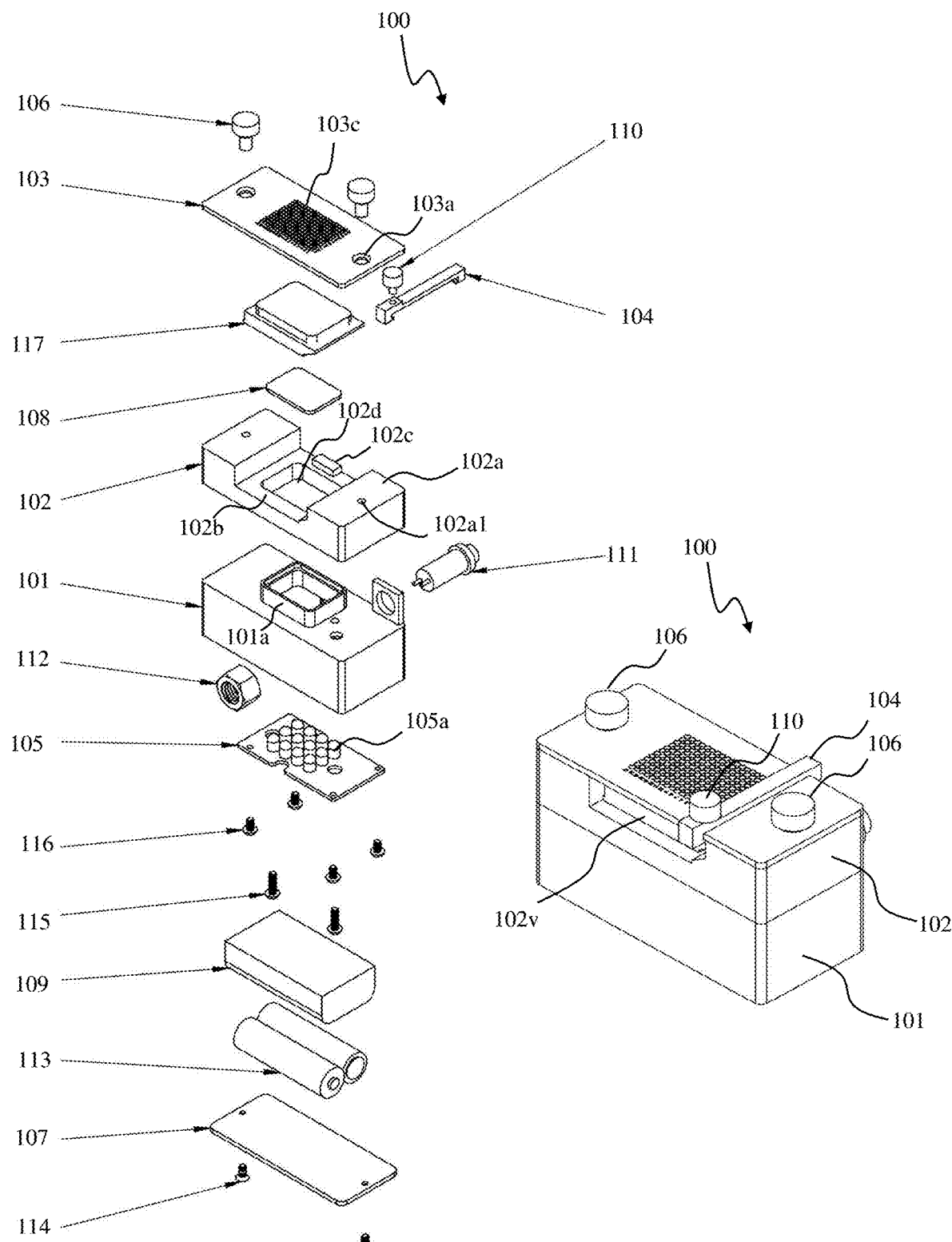
FIG. 1 shows an exploded view of certain components of an arrayer, as well as an assembled arrayer, according to embodiments of the present invention.

FIG. 1 shows an exploded view of components of a tissue arrayer of the present invention (left) as well as an assembled arrayer (right), wherein the meanings of the reference numerals used are provided as follows: 101. Tissue arrayer base; 102. Recipient block holder; 103. Guide plate; 104. Positioning slider; 105. LED panel; 106. Self-aligning plate locknut; 107. Battery chamber lid; 108. LED light diffuser plate; 109. Battery chamber; 110. Positioning slider set screw; 111. LED light switch; 112. Switch nut for LED panel; 113. Battery; 114. Screws for battery chamber lid; 115. Arrayer base joining screws; 116. Screws for the LED panel; 117. Recipient block.

As seen in FIG. 1, recipient block holder 102 having two side portions with an upper face 102a to connect the guide plate 103a through the two screw holes 102a1 and two self-aligning plate lock nuts 106, a middle section with reduced thickness and a top surface 102b and a center through opening 102d, and a stopper bump 102c disposed on a side. The recipient block holder 102 forms a void 102v, the size and dimension of which is configured to accommodate recipient block 117, which can be slid in from a front side of the void. The horizontal position of the recipient block can be fixed by the stopper 102c. The guide plate 103 is substantially flat and can be stacked on top of the upper surface 102a of the recipient block holder 102. In the mid-section of the guide plate 103 there is an array of through openings 103c aligned with the void of the recipient blocking holder 102. The recipient block holder 102 and the guide plate 103 are configured to be secured to each other through securing elements. As shown, the guide plate 103 has two countersink holes 103a, and via the two self-aligning locknuts 106, can be secured to the upper surface 102a of the recipient block holder 102 via the screw holes 102a1 which are aligned with the countersink holes 103a on the guide plate 103.

The recipient block holder 102 can sit on top of the arrayer base 101 and the two parts joined by joining screws 115, and the through opening 102d of the recipient block holder 102 aligned with a center hollow stage 101a of the arrayer base 101. The arrayer base 101 contains illuminating elements and power source for the illuminating elements for the use of the arrayer. It includes a LED panel 105 (which contains an array of LED bulbs 105a) which is positioned under the center stage 101a of the arrayer base. LED light by the LED bulbs provides illumination from the bottom through the recipient block which is usually partially translucent (e.g., a paraffin block) to facilitate operation of the arrayer. The arrayer base 101 also includes battery holder 109, which can accommodate batteries 113, with battery cover 107 which can be secured to the battery holder with screws 114. The LED bulbs can be turned on and off by the LED switch 111. A LED light diffuser plate 108 can be disposed on top of the LED panel 105, e.g., disposed in the recess on the top of the hollow stage 101a of the arrayer base 101.

The arrayer base 101 can be detached from the recipient block holder by removing the joining screws 115. One could operate an assembly of the block holder and guide plate (e.g., creating holes and injecting tissue core into the holes) without the arrayer base 101 and the various elements contained therein. Such operations are especially advantageous in a freezing chamber for acquiring and injecting frozen tissue samples.

Figure 2:
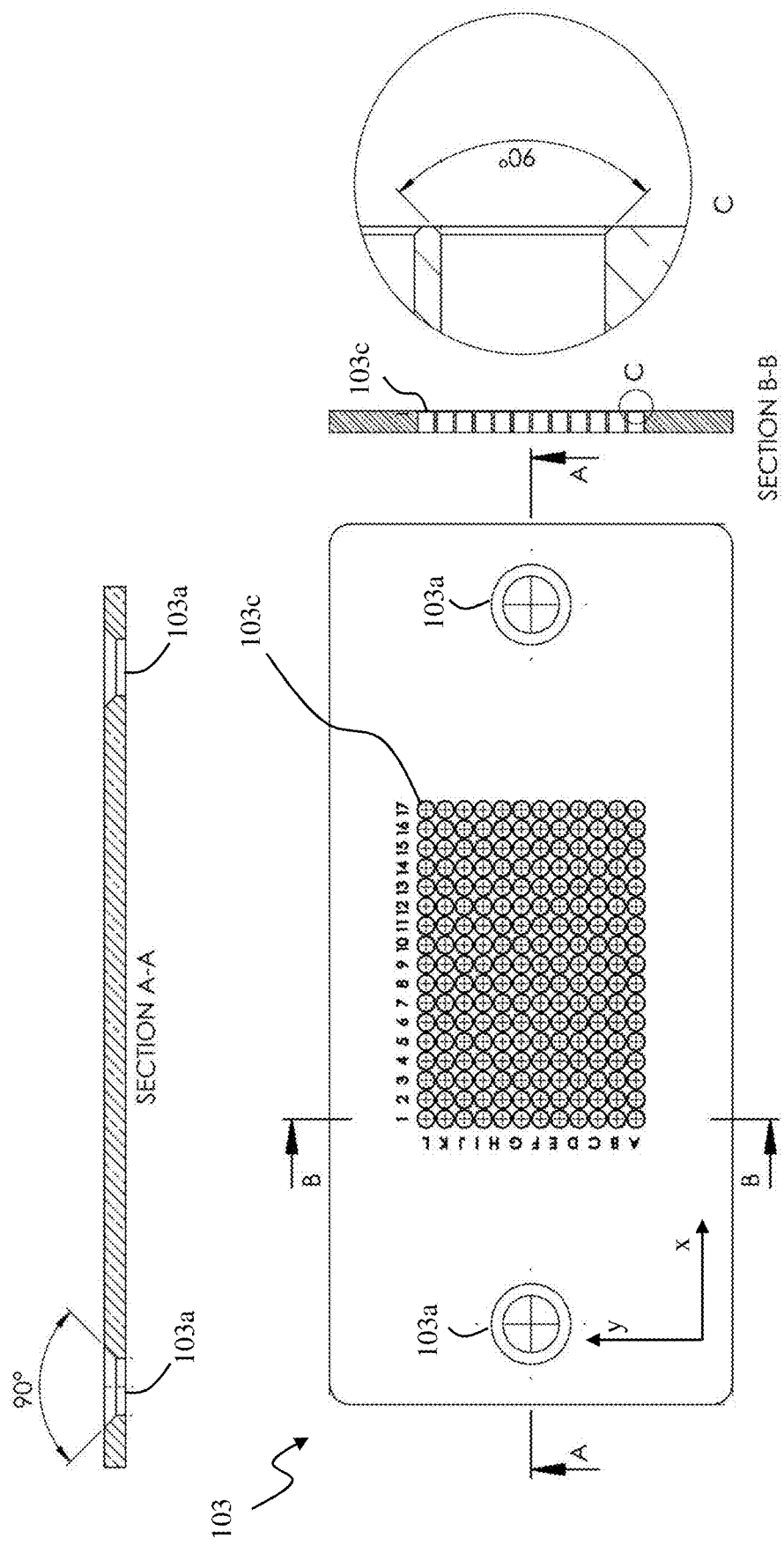
FIG. 2 is a schematic drawing of a guide plate according to embodiments of the present invention.

FIG. 2 shows a schematic drawing of the guide plate. A-A: Cross-sectional view of the guide plate with locknut countersink holes 103a at both ends; B-B: Cross-sectional view of the guide plate with array of countersink array holes 103c; C. Cross-sectional view of an enlarged array hole with chamfered top for easy and accurate acceptation of donor puncher tip (shown in FIGS. 3-6 below). The locknuts 106 shown in FIG. 1 can each have a conical seat matching the top conical section of the countersink holes 103a. The array holes are arranged in a matrix-like fashion in the x and y directions (x being the lengthwise direction of the guide plate and the y being the width direction of the guide plate). The typical width and length of a guide plate can be 1.5 inches (38 mm) and 3¼ inches (82 mm), and other dimensions can be selected if needed. The thickness of the guide plate can be selected as needed, for example, from 1 to 3 mm, or 1.5 to 2.5 mm, e.g., 1.5 mm, 2 mm, 2.5 mm, etc. The diameters of the through holes on the plate can be selected based on the applications, e.g., 1 mm, 1.5 mm, 2 mm, 2.5 mm, 3.5 mm, 4.5 mm, etc.

Figure 3:
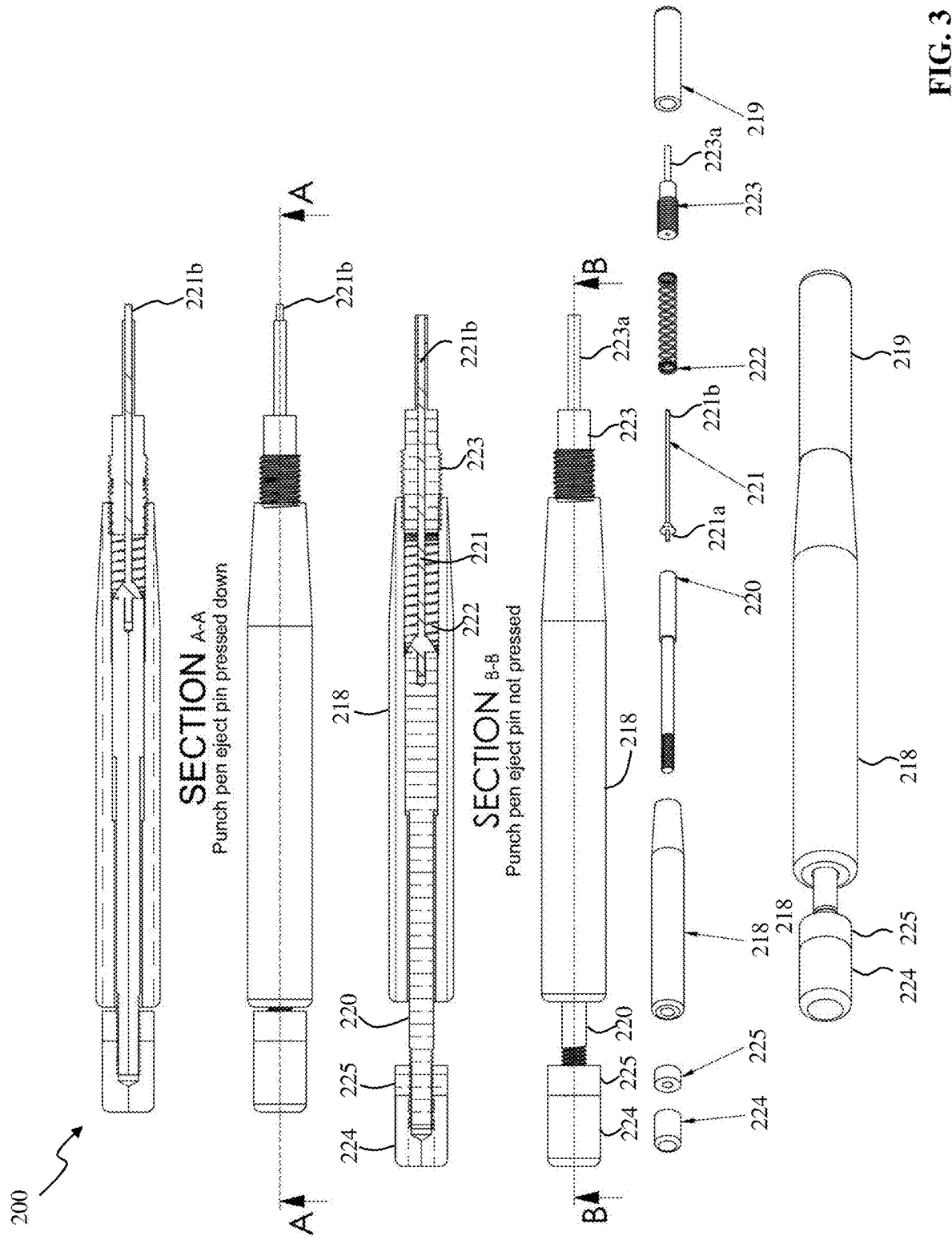
FIG. 3 is a schematic presentation of cross-sectional view and exploded view of a punch pen according to embodiments of the invention.

FIG. 3 is a schematic presentation of cross-sectional view and exploded view of a punch pen. A-A: Punch pen in press-down position; B-B: Punch pen in release position. In these views, punch pen cap 224 and punch pen cap locknut are both threaded on the punch pen eject rod 220, which is enclosed in the punch pen body 218. The punch pen eject rod 220 is coupled at its distal end with a punch pen eject pin 221 having an enlarged portion 221a near its proximal end which engages a proximal end of a spring 222, and a distal tip 221b.

The stem portion of the eject pin 221 goes through the center of the spring 222 and through the inner lumen of a hollow punch pen puncher 223 having a distal tip portion 223a. When the spring 222 is relaxed, the distal end of the eject pin is retracted within the punch pen puncher and invisible from the outside. When the spring 222 is compressed by pressing the pen cap 224, the distal end of the eject pin 222 can extend out of the distal tip 223a of the punch pen puncher 223, thereby ejecting material previously captured in the hollow interior of the distal tip portion 223a. The punch pen puncher is coupled with a punch pen puncher protector 219.

To create a TMA block, two punch pens, a recipient punch pen and a donor punch pen can be used. The recipient punch pen can be used to create a hole in a recipient block (e.g., a paraffin block), while the donor punch pen extracts a tissue core from a donor block and ejects, through the guide plate, the tissue core into the hole made in the recipient block. The diameter of the tip of the recipient pen puncher can be slightly smaller than the array through hole of the guide plate to allow the recipient pen puncher to go through the array through hole and create a hole on the recipient block. The diameter of the tip of the donor pen puncher can be larger than the diameter of the through array hole of the guide plate, but the distal end of the eject pin of the donor pen punch can have a diameter slightly smaller than the through array hole of the guide plate. This allows the eject pin of the donor pen punch to go through the array hole of the guide plate and eject an extracted tissue core into the already-made hole on the recipient block.

Figure 4:
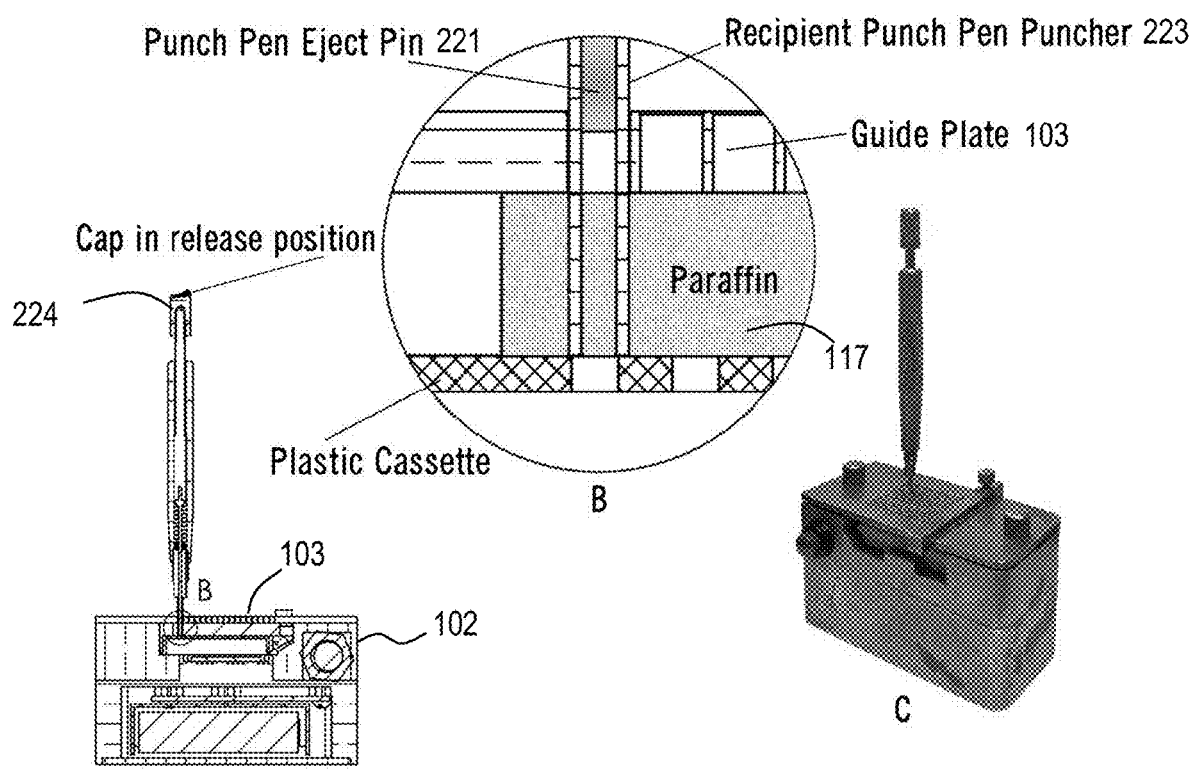
FIG. 4 shows example steps for a recipient punch pen to create a hole in the recipient block according to embodiments of the invention.
Figure 4:
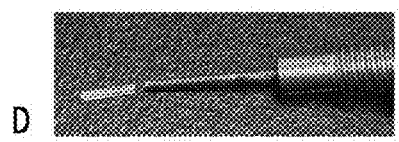
Figure 4:
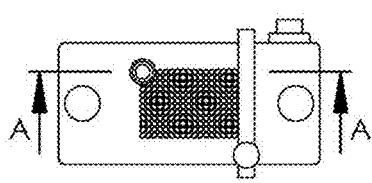
Figure 4:
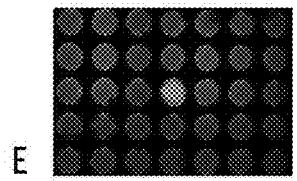

FIG. 4 shows example steps for using a recipient punch pen to create a hole in the recipient block through the guide plate.

Step 1: Put the recipient block 117 in the recipient block holder 102 and lightly tighten the guide plate self-aligning locknuts 106. Turn on the LED panel 105 by the switch 111 (Nut 112 is used to fasten switch 111). It is covered by block holder 102. Move and fix the position slider 104 (by fastening the nut 110 on the slider 104) to the front of the first array column on the guide plate, and use the slider as the general starting position for each row. The position slider 104 has two distal ends engaging the edges of the guide plate and can move along the length direction of the guide plate.

Step 2: With the cap 224 in release position, insert and press the puncher 223 of the recipient punch pen through an array hole on the guide plate 103 into the recipient block 117. The wide opening at the top of each countersink hole on the guide plate receives and self-aligns the puncher of the punch pen. The wall of the hole (or the plate) is thick enough to ensure that the puncher moves vertically into the recipient block and creates a vertical hole. The operator should also hold the punch pen as vertically as possible against a countersink hole on the guide plate. A-A. Cross-sectional view of the present tissue arrayer for creating a hole in the recipient block; B. Enlarged cross-sectional view of the recipient puncher punching through a guide plate hole into a recipient block; C. Photo of the recipient punch pen punching through the guide plate into a recipient block 117;

Step 3: Remove the recipient puncher from the recipient block and eject the paraffin core from the recipient block by pressing down the cap of the recipient punch pen. D. Photo of the recipient punch pen ejecting a paraffin core from the recipient block; E. Under the LED light, a hole in the recipient block can be identified through the guide plate.

Figure 5:
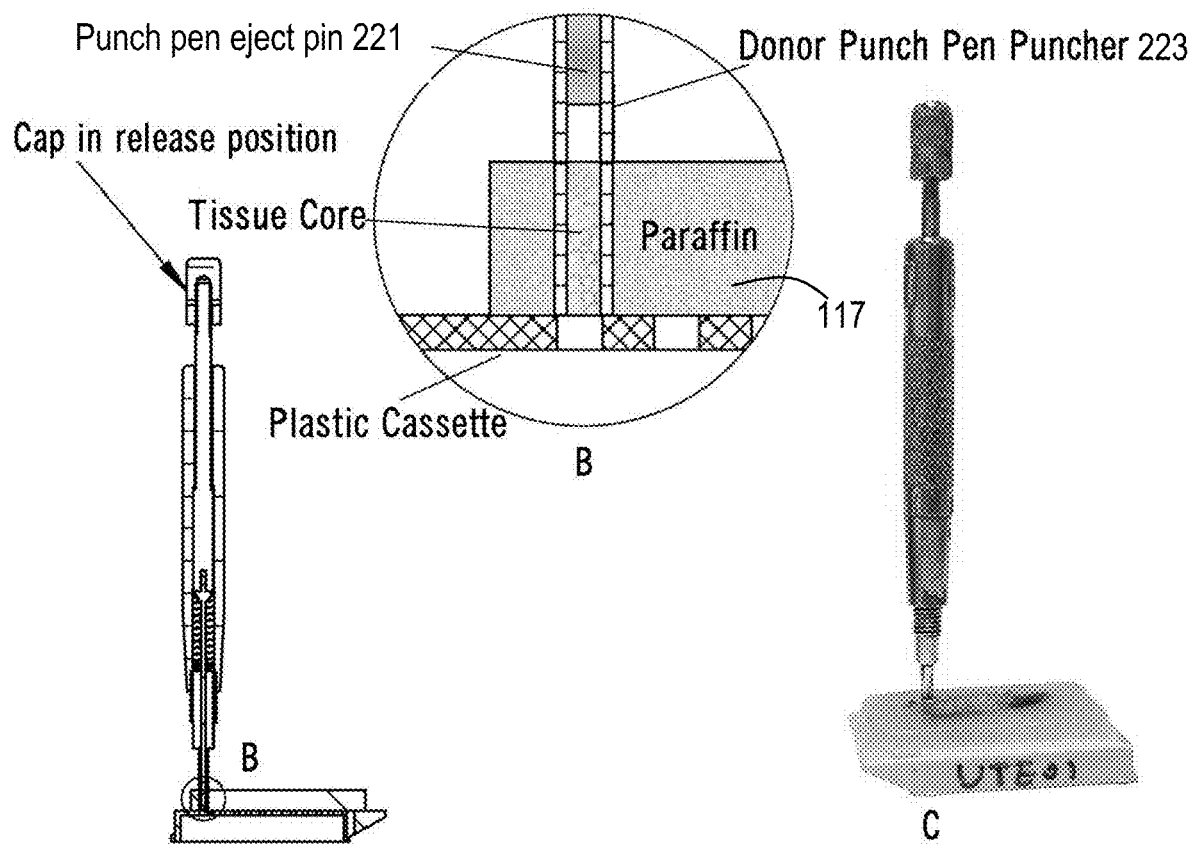
FIG. 5 shows example steps for a donor punch pen to extract a tissue core from a donor block according to embodiments of the invention.
Figure 5:
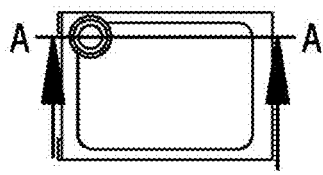
Figure 5:
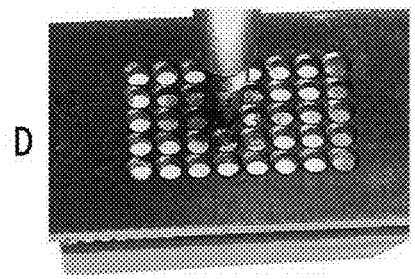
Figure 5:
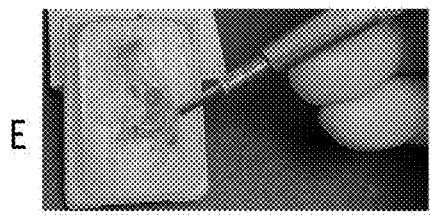

FIG. 5 shows example steps for a donor punch pen to extract a tissue core from a donor block (e.g., a tissue sample). For convenience, the elements of the donor punch pen are referenced in the same way as those in the recipient punch pen.

Step 1: Adjust the donor punch pen cap 224 up and down to reach an appropriate depth of the punch pen eject pin 221 according to the thickness of the recipient block and donor tissues. Tighten the cap lock nut 225.

Step 2: With the punch pen cap 224 in the release position, press the puncher 223 of the donor punch pen into the selected spot on a donor block 117a. A-A. Cross-sectional view of the donor puncher punching into a selected spot on a donor block; B. Enlarged cross-sectional view of the donor puncher in a donor block with a donor tissue core inside the puncher; C. Photo of the donor punch pen punching into a donor block 117a. To prevent damages, such as cracks to a donor block by punching impact, a guide plate with array holes (such as one shown and described herein) can be placed on the top of the donor block and a punch can be made through a larger array hole on the plate into the donor block 117a (see photo D).

The punch pen can operate well on a donor block on a light box, under a magnify glass or a dissection microscope, or a donor block simply held by hand against light. To maximize extraction of donor tissue, especially for a thin tissue slice or small biopsy, the punch pen can even be pressed into the donor block at any desired angle (see photo E), and the puncher can be moved along the surface or inside the donor block to extract needed tissue.

Although it is shown in FIG. 5 that the donor block is a paraffin block, the punch pen can also be used to extract frozen tissue sample in a similar manner. The extraction and transfer of a frozen tissue sample by a donor punch pen can be conducted in a cryo environment (temperature below −20 degree Celsius), such as a lab freezer or a dry ice box. The arrayer (with or without the arrayer base) can be brought into the cryo environment for the operation.

Figure 6:
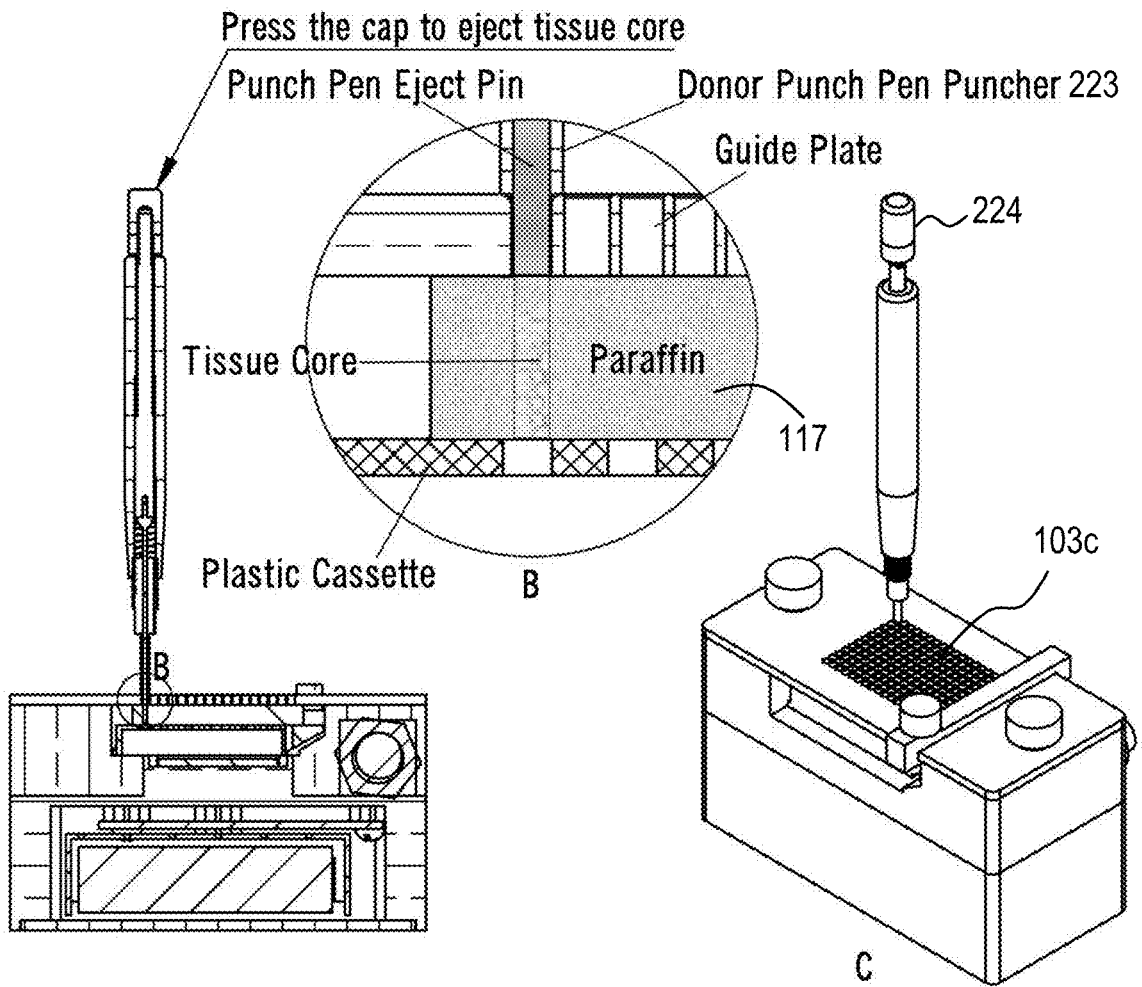
FIG. 6 shows example steps for inserting a donor tissue core into the recipient block through the guide plate according to embodiments of the invention.
Figure 6:
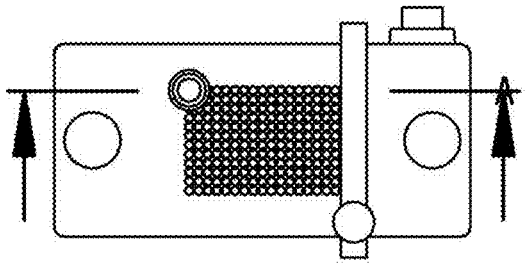
Figure 6:
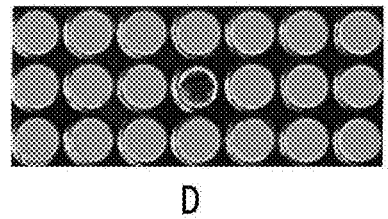

FIG. 6 shows example steps for inserting a donor tissue core into the recipient block through the guide plate.

Step 1: Remove the donor punch pen from a donor block and put the puncher of the pen onto the top of an array hole on the guide plate (see part C).

Step 2: Hold the donor punch pen as vertically as possible and press the cap 224 of the pen against the array hole on the guide plate 103 and eject the donor tissue core into the recipient block 117. A-A. Cross-sectional view of the donor punch pen on an array hole of the guide plate with the pressed-down cap and donor tissue core into the recipient block. B. Enlarged cross-sectional view of the donor puncher pushing the tissue core into the recipient block by the eject pin; C. Drawing of the donor punch pen stands on top of an array hole on the guide plate; D. Under LED light, a tissue core inserted in the recipient block can be identified through the guide plate.

Figure 7:
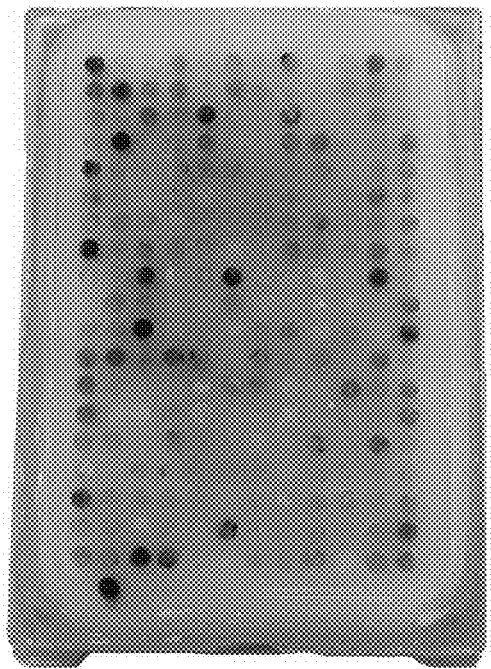
FIG. 7 shows example photographs of TMA blocks prepared by the device and method according to embodiments of the present invention.
Figure 7:
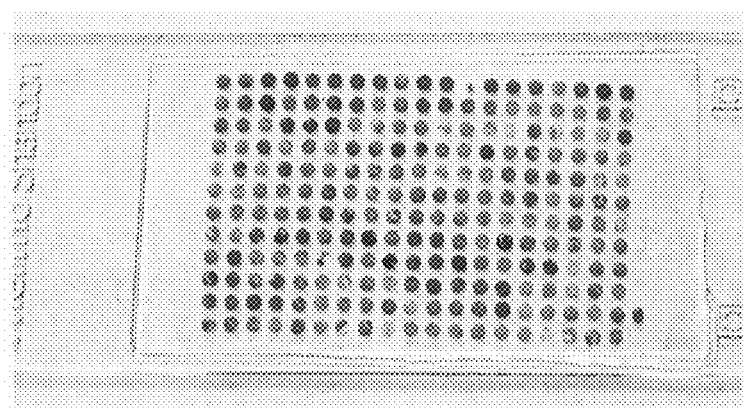

FIG. 7 shows example photographs of TMA blocks made by the device and methods of the present invention. A. A high density TMA block containing 228 tissue cores; B. a H&E stained TMA section of A.

Benefits provided by embodiments of the present invention include:

The arrayer of the present invention is low cost and affordable for constructing TMA blocks with a wide range of core sizes or densities.

Other available tissue arrayers usually include delicate parts for precision movements and require special cautions or package to move or travel with. In contrast, the arrayer of the present invention can be made into very compact size and shock resistant, making it easy to carry or travel with.

The set-up of other available arrayers usually requires special training, defined platform, electricity, light, light magnify lens, frequent calibrations, and so on. In contrast, the arrayer of the present invention provides flexibility to make it possible to construct tissue array block in almost any environment. The easy assembly of the arrayer of the present invention allows for large scale production of TMA blocks simultaneously by using multiple arrayers in a limited space, which are not possible by other TMA arrayers.

The device can provide a traceable location for each core on the self-aligned guide plate and recipient block holder. This feature allows accurate repair, refill or replacement of any core in a TMA block after it is made.

Both the guide plate and recipient block holder can be made from metal, such as bronze, and can be detached from the arrayer base. The punch pens or parts (e.g., the puncher and/or the eject pin) can also be made by metal such as bronze. Thus, with its small size, the guide plate and recipient block holder can be conveniently placed in a cryo environment, such as in a box filled with dry ice or in a freezing chamber for creating frozen tissue array blocks.

Further, the arrayer of the present invention can minimize the punching impact damages on the recipient TMA block, and create high quality of TMA blocks with leveled core surface and precise core alignments.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art.

The invention claimed is:

1. A method of operating an arrayer comprising:
a recipient block holder having an upper face, and a void for accommodating a tissue recipient block; a guide plate configured to engage with the upper surface of the recipient block holder, and including an array of through openings aligned with the void of the recipient blocking holder; and wherein the recipient block holder and the guide plate are configured to be secured to each other through securing elements,
the method comprising:
positioning a recipient block in the void of the recipient block holder;
securing the guide plate in relation to the recipient block holder;
creating a hole on the recipient block by inserting a puncher of a recipient punch pen through one of the through openings of the guide plate and extracting a plain core from the recipient block;
acquiring a portion of a tissue of interest into a hollow section of a puncher of a donor punch pen; and
injecting the portion of the tissue of interest into the hole created on the recipient block through the one of the through openings of the guide plate by causing an eject pin of a donor punch pen to go through a puncher of the donor punch pen and the one of the through openings of the guide plate while positioning the puncher of the donor punch pen above the one of the through openings of the guide plate.

2. The method of claim 1, further comprising:
turning on the LED light source during the operation of the arrayer.

3. The method of claim 1, wherein acquiring the portion of the tissue of interest comprises acquiring a portion of a frozen tissue.

4. The method of claim 3, wherein acquiring the portion of a tissue of interest into the hollow section of the puncher of the donor punch pen is performed in a cryo environment.

5. The method of claim 1, wherein acquiring the portion of a tissue of interest comprises acquiring a portion of paraffin-embedded tissue.

* * * * *